United States Patent

Alth

[15] 3,700,942
[45] Oct. 24, 1972

[54] SELF-STARTING SYNCHRONOUS MOTORS

[72] Inventor: Max Alth, 6 Tamarack Road, Port Chester, N.Y. 10573

[22] Filed: Feb. 3, 1971

[21] Appl. No.: 112,206

[52] U.S. Cl. .................310/164, 310/167, 310/268
[51] Int. Cl. ...........................................H02k 21/00
[58] Field of Search........310/41, 164, 165, 163, 162, 310/268, 167, 194, 156

[56] References Cited

UNITED STATES PATENTS

| | | | |
|---|---|---|---|
| 2,378,556 | 6/1945 | Jeffers | 310/268 UX |
| 3,330,975 | 7/1967 | Osterwalder | 310/41 X |
| 2,070,447 | 2/1937 | Morrill | 310/164 |
| 3,221,196 | 11/1965 | Henry-Baudot | 310/268 |
| 2,444,164 | 6/1948 | Kohlhagen | 310/164 |
| 2,779,882 | 1/1957 | Ishikawa | 310/268 X |
| 3,159,760 | 12/1964 | Olofsson | 310/268 X |
| R18,145 | 8/1931 | Holtz | 310/164 |
| 168,018 | 9/1875 | Heikel | 310/268 X |
| 3,311,767 | 3/1967 | Faulkner | 310/268 X |

Primary Examiner—J. V. Truhe
Assistant Examiner—B. A. Reynolds

[57] ABSTRACT

A conductive metal disc is mounted on a shaft. A number of magnets are mounted on said disc in a cicle, equidistant from each other, equidistant from said shaft and a distance in from the edge of the disc. This is the rotor. The stator comprises a number of coils mounted on U-shaped iron cores. The cores are positioned, open ends inwards, towards the shaft, overlapping the edge of the disc, circumferentially about the rotor. Cores are directed at equal angles, from 15° to 90° to the radii of the disc. As flux propagation is in relatively narrow bands at an angle other than radial to the shaft, the conductor is repulsed and turns. Synchronization occurs at a speed related to number of driving poles and rotating fields.

Alternately, PMs may be replaced by coils powered by DC taken from slips rings; by induced AC power converted to DC by rectifiers connected to the coils and mounted on the rotor, and by shorted turns on said rotating poles.

6 Claims, 9 Drawing Figures

PATENTED OCT 24 1972

INVENTOR.

Max Alth

PATENTED OCT 24 1972
3,700,942
SHEET 2 OF 2
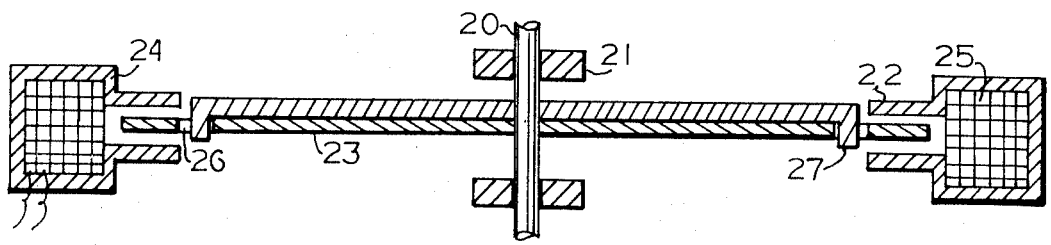
fig. 5
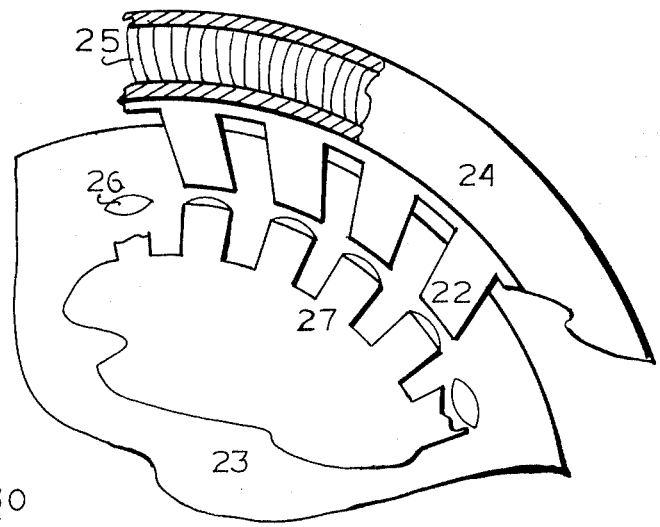
fig. 6
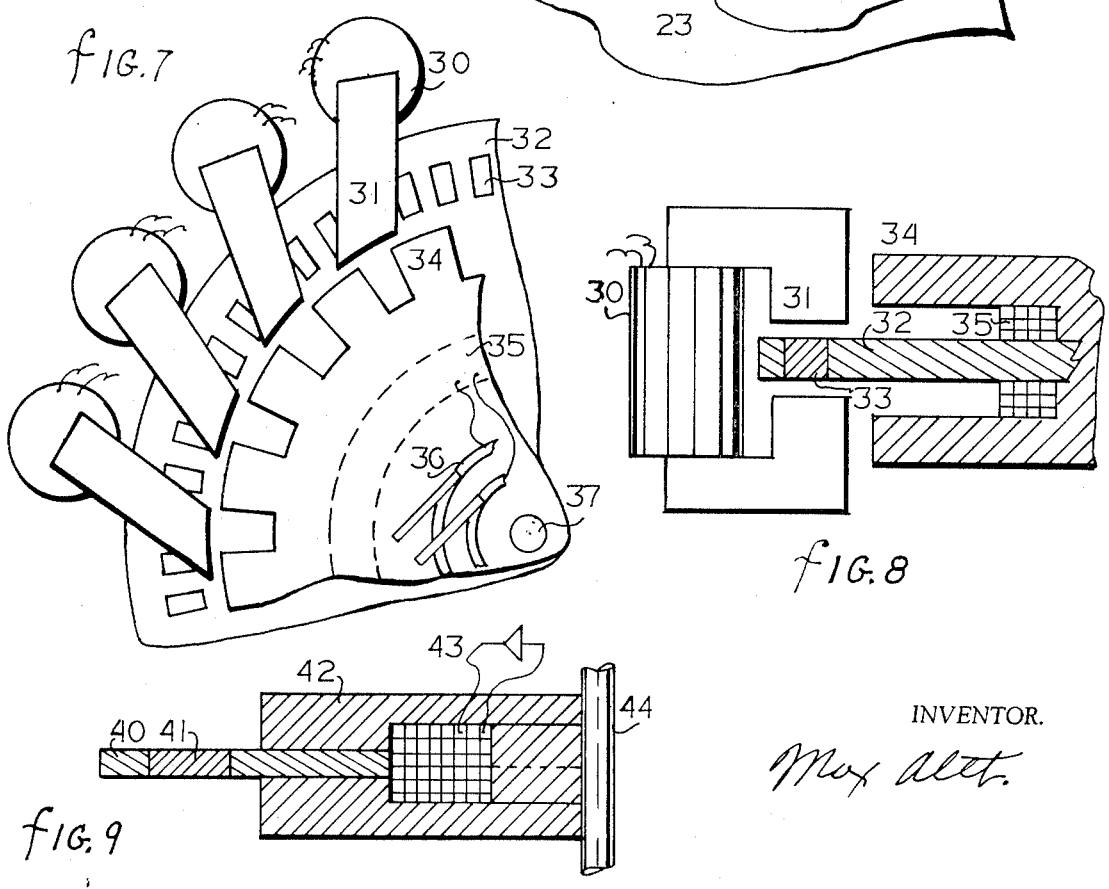
fig. 7
fig. 8
fig. 9
INVENTOR.
Max Alth

SELF-STARTING SYNCHRONOUS MOTORS

BACKGROUND TO PRESENT DISCLOSURE

The present invention is a continuation of prior work that resulted in earlier patent applications:

Swing-field alternator
803 485
Feb. 28, 1969
Group 214.. abandoned

Eddy current brakes
841 938
07/15/69
Group 214.. claims granted, formal patent not as yet issued.

Self-Start Single Phase Motor
87,995
11/09/70
Group 214

Self-Start Single Phase Motor
Submitted Jan. 8, 1971
An improvement over above, no notification of receipt at office as yet Alternators ( and Synchronous Motor)
25 117
04/02/70
Group 214

A self-start single-phase motor. The present invention is a continuation of this work.

The present invention provides a self-starting synchronous motor which:
is suited to single and multi-phase operation,
always starts in the same direction,
has high starting torque,
simple to construct and maintain,
suited to low, medium and high-power embodiment,
can be embodied in a generally pancake shape,
can be embodied in a conventional shape or profile,
operates as a self-start induction motor when overload pulls it out of sync.

FIG. 5 is a cross-sectional view of a low-power, low rpm, high torque, simple embodiment of the invention.

FIG. 6 is partial plan view and cut-away of FIG. 5.

FIG. 7 is a partial plan view of a high-power motor suited to multi-phase operation.

FIG. 8 is a partial cross-sectional view of the stator cores and rotor of the motor in FIG. 7.

FIG. 9 illustrates another type of rotor construction suited for use with the motor shown in FIG. 7.

PRINCIPLE OF OPERATION

Figure 3:
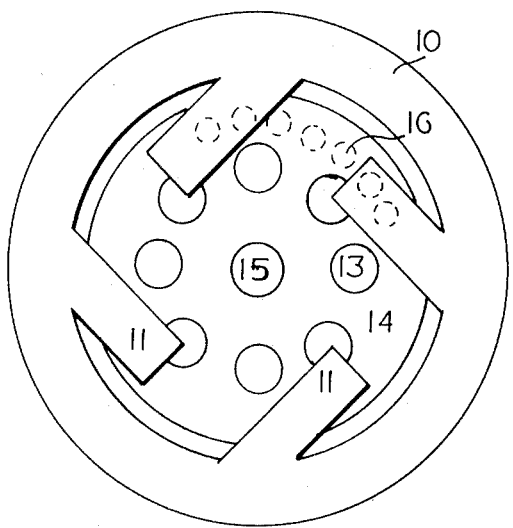
FIG. 3 is a plan view of another variation of the motor.
Figure 4:
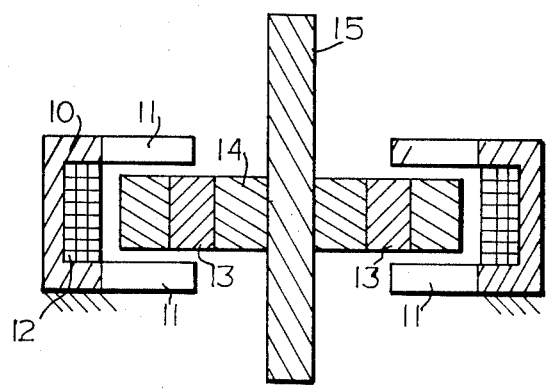
FIG. 4 is a cross-sectional view of FIG. 3.

Referring to FIG. 3, a plan view of a simple, medium-power embodiment of the present invention; 15 is the shaft which carries conductive disc 14, 13 is one of a group of permanent magnets, 11 is an upper stator pole which is an extension of the generally U-shaped annulus 10. Referring to FIG. 4: 15 is again the shaft, 14 the conductive metal disc, 13 the permanent magnet, 12 the stator coil, 10 the annulus of iron or a similar magnetically permable material, and 11 are the stator pole arms.

When coil 12 is energized with alternating current, flux is generated between arms 11. The flux propagates initially outwards in a generally confined width and causes disc 14 to rotate by virtue of opposing fields induced in the conductive metal. At a particular speed of rotation, the permanent magnets will come into synchronization with the stator poles. At this speed the motor operates as a conventional synchronous motor. Should it be overloaded and pulled out of sync, it automatically converts to an induction motor.

Referring to FIG. 3, note the circles indicated by 16. These may comprise a plurality of small iron bars set into the conductive rotor. This will increase starting torque. For simplicity, they are excluded from FIG. 4.

Figure 1:
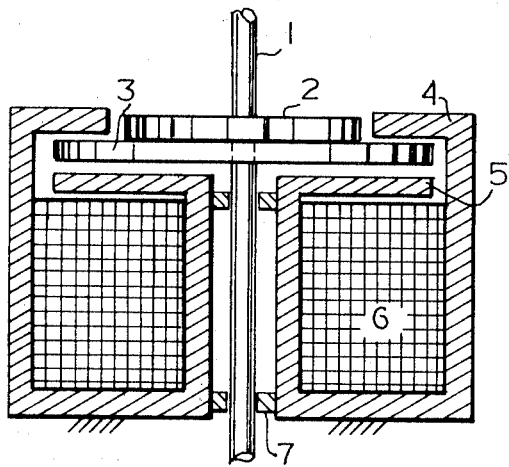
FIG. 1 is a cross-sectional view of a low-power, minimum-diameter version of the present invention.
Figure 2:
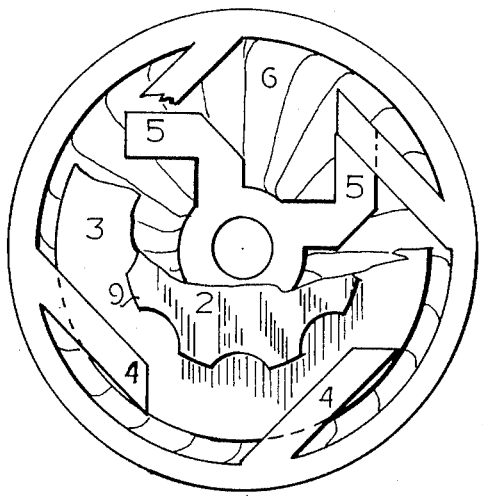
FIG. 2 is a plan view of the same design.

Referring to FIG. 1, this is a low-power version of the motor, arranged for a minimum diameter profile. One is the shaft on which permanent magnet 2 rides as does conductive disc 3. Six is the driving coil connected to an AC source of current. Four and 5 are pole terminations; respectively north and south, depending on the moment in time. Seven indicates a bearing supporting shaft 1. Referring to FIG. 2, please note how pole 4 is directed somewhat tangentially in regard to conductive metal disc 3. Note how the other pole, 5 has been bent to point somewhat tangentially to disc 3 and how pole 5 is placed beneath pole 4. Six is again the AC coil, 2 is the permanent magnet, and 9 is one pole on that magnet. When AC current is fed to coil 6, a field perpendicular to conductive disc 3 is generated between poles 4 and 5. This field strikes the conductive disc obliquely and causes it to turn. At sync speed the poles on the PM 9 lock to the AC poles.

FIG. 5 is a cutaway view of a large diameter, shallow depth configuration of the disclosed moter. This embodiment is suited to low-power, low-rpm, high-torque applications. In this design the magnet 27 has its pole ends bent to fit into holes 26 in the conductive rotor 28. Operating principle remains the same. Twenty is the shaft, 21 the bearing, 22 the stator pole arms, 24 the annulus, 25 the AC driving coil.

FIG. 6 is a partial plan view of the motor in FIG. 5. All parts bear the same numerical designations. The angle of the pole arms 22, should be noted.

FIG. 7 illustrates a high-power version of the motor, designed for multi-phase operation. Thirty-one indicates the U-shaped stator cores, 30 indicates a stator coil. These coils be be connected in series, parallel, Y or Delta as need be. In the same Figure, 32 is the conductive disc ( or ring) 33is an iron core in that ring, 34 is a multi-arm iron hub, 35 the field coil, 36 slip rings, 37 the supporting shaft. Referring to FIG. 8, the same notations are employed. Note that there is a second multi-arm iron hub, note the position of field coil 35. When this is energized with DC, a plurality of north and south poles are formed. On starting, the stator coils develope a repulsive torque in the conductive disc or rotor 32, around the iron cores 33. At sync speed, the poles 34 lock into the stator poles 31.

FIG. 9 illustrates how slip rings may be eliminated. The same general arrangement of parts are employed; 40 is the conductive ring, 41 the iron cores, 42 the field hubs, 43 the field coil and a rectifier, which is mounted on the rotor. Forty-four is the shaft. In operation, maximum AC current is transferred by induction from coils and cores 30 and 31 to field poles 42. The AC current is rectified producing the requisit DC. Although only a single coil and rectifier is shown, full wave rectification with two coils and rectifiers could be employed.

Currently, all single-phase indction motors are started by distorting the driving field. This is done by means of shading coils-which may be a single turn of copper or aluminum, and or by starting coils positioned to one side of the driving coil and pole assembly and supplied with out-of phase current.

The eseence ofthe present disclosed is that the cost, weight, size and power consumption of the aforementioned starting means can be eliminated by directing the AC field,approximately tangentially across the rotor disc. If one winds a coil on a U-shaped iron core and supplies this device with AC current, a conductive element placed within the arms of the U will be forced out. This force can be utilized for initiating and continuing rotation of a conductive disc by confining the field into a relatively narrow angle, by means of U-shaped members having relatively narrow arms, and directing the AC field at an angle some where between radial and tangential.

Once rotation has been initiated, the rotor will assume a speed commensurate with the frequency of the applied current and the load on the disc.

In the present invention the above arrangement has been further developed by replacing the single U-shaped pole assembly by a plurality of pole assemblies, and by placing permanent magnetic poles on the rotor by various strategems. The result is a synchronous motor that starts like an induction morot, or is started as an induction motor and then operates as a synchronous motor at speed. Overloaded, the synchronous motor slows down and is driven as an induction motor.

The advantages of this disclosure is that the cost and power loses inherent in the shaded pole, single-phase motor, and the switch usually attending the off-set starting coil motor, which is switched out of the circuit at speed, are eliminated.

Having described my invention and its manner of manufacture, this is what I claim as new and novel and desire to secure by Letters Patent:

1. A self-starting synchronous motor comprising an electrical conductive means generally circular in outline and fastened to a shaft means orthogonal to its center, a plurality of small permanent magnets piercing said conductive means, said magnets generally positioned a distance inward from edge of said conductive means and generally equidistant from each other and generally circular aboutsaid shaft means; said magnets cooperating with the flux to produce synchronization; a plurality of AC-flux generating means comprising a plurality of electrical coils mounted on a plurality of U-shaped cores of magnetically permeable material, open ends of said U-shapes passing above and below said conductive means, all said arms generally parallel and directed at an angle generally oblique to radii of said conductive means.

2. A device as claimed in claim 1, said flux generating means to comprise an annulus of magnetically permeable material, said annulus to have a U-shaped cross section the edges of which are deeply notched to form a plurality of pole arm pairs, all generally parallel, all pointing generally inward towards the center of said conductive means at an oblique angle, said arm pairs passing above and below said conductive means, in addition an electric coil of wire within said annulus.

3. A device as claimed in claim 1, said magnetic pole means to comprise a single piece of permanently magnetized material, generally circular in shape, generally flat with edges cut into a plurality of small arcs, each an individual magnetic pole.

4. A device as claimed in claim 1, said magnetic pole means to comprise a pair of hubs of magnetically permeable material, pierced to accept said shaft means, circumferentially notched to form a plurality of magnetic poles, said poles to be within the influence of said alternating current magnetic pole means, in addition a coil positioned axially between said hubs, said coils connected to slip rings.

5. A device as claimed in claim 1, having an electrically conductive means generally circular in outline and fastened to a shaft means orthogonal to its center and having a plurality of permanent magnets piercing said conductive means, said magnets generally positioned a distance from each other and generally circular about said shaft means, in addition having a plurality of magnetically permeable cores generally positioned circularly about said shaft and a distance inward from the edge of said conductive means, said permeable magnetic cores disposed to cooperate in conjunction with said permanent magnets and said AC flux means.

6. A device as claimed in claim 1, said magnetic pole means to comprise a pair of hubs of magnetically permeable material, pierced to accept said shaft means, circumferentially notched to form a plurality of magnetic poles, said poles to be within the influence of said alternating current magnetic pole means, in addition a coil positioned axially between said hub, said coil connected to a rectifying means.

* * * * *